United States Patent [19]

Nakajima

[11] Patent Number: 4,860,116

[45] Date of Patent: Aug. 22, 1989

[54] METHOD OF MEASURING SHADING CHARACTERISTICS IN IMAGE INFORMATION READING APPARATUS WITH A TEST RECORDING MEDIUM

[75] Inventor: Nobuyoshi Nakajima, Kanagawa, Japan

[73] Assignee: Fuji Photo Film Co., Ltd., Kanagawa, Japan

[21] Appl. No.: 256,947

[22] Filed: Oct. 13, 1988

[30] Foreign Application Priority Data

Oct. 13, 1987 [JP] Japan ................................ 62-258059

[51] Int. Cl.$^4$ .............................................. H04N 1/40
[52] U.S. Cl. .................................... 358/447; 358/443; 358/464; 358/494
[58] Field of Search ................ 358/280, 282, 284, 293

[56] References Cited

U.S. PATENT DOCUMENTS

| 4,513,325 | 4/1985 | Itoh .................................... 358/280 |
| 4,661,699 | 4/1987 | Welmers et al. .................... 358/293 |
| 4,751,377 | 6/1988 | Ishizaka et al. .................... 358/293 |

FOREIGN PATENT DOCUMENTS

| 55-12429 | 1/1980 | Japan . |
| 56-11395 | 2/1981 | Japan . |
| 56-11397 | 2/1981 | Japan . |
| 62-16666 | 1/1987 | Japan . |

Primary Examiner—James J. Groody
Assistant Examiner—Kim Yen Vu
Attorney, Agent, or Firm—Sughrue, Mion, Zinn, Macpeak & Seas

[57] ABSTRACT

Test image information is recorded on a test recording medium and the test recording medium is scanned with a light beam to produce an image signal in each of two modes in which the test recording medium is oriented such that a prescribed line on the test recording medium extends in a main scanning direction and an auxiliary scanning direction substantially normal to the main scanning direction respectively in the two modes. A signal level distribution A(x) is determined along the prescribed line of a signal indicative of a logarithmic function of an output signal from a light detector when the prescribed line extends along the main scanning direction, and a signal level distribution B(x) along the prescribed line of a signal indicative of a logarithmic function of an output signal from the light detector when the prescribed line extends along the auxiliary scanning direction (x indicates a pixel position on the prescribed line). Shading characteristics of an image information reading apparatus along the main scanning direction are determined based on the difference A(x)−B(x) between the signal level distributions A(x) and B(x).

1 Claim, 2 Drawing Sheets

METHOD OF MEASURING SHADING CHARACTERISTICS IN IMAGE INFORMATION READING APPARATUS WITH A TEST RECORDING MEDIUM

BACKGROUND OF THE INVENTION

1. Field of the Invention

The present invention relates to a method of measuring shading characteristics in an apparatus for reading recorded image information from a recording medium by scanning the recording medium with a light beam to emit light representative of the image information and detecting the emitted light.

2. Description of the Prior Art

There are known image information reading apparatus in which a light beam is applied to scan a recording medium with image information recorded thereon and light reflected by, passing through, or emitted from the recording medium is detected to read the recorded image information. Heretofore, such an image information reading apparatus is employed in an image input unit for a computer, an image reader in a facsimile transmitter/receiver, or the like, for example. As one type of such an image information reading apparatus, a radiation image information reading apparatus is disclosed in Japanese Laid-Open Patent Publication No. 56-11397 in which a stimulating light beam is applied to a stimulable phosphor sheet with radiation image information of a human body, for example, recorded thereon to cause the irradiated area of the sheet to emit light representative of the radiation image information, which is then detected to produce an image signal bearing the radiation image information.

As disclosed in the aforesaid publication, the image information reading apparatus has a light detector connected to a light guide for detecting the emitted light efficiently. More specifically, the light guide that is made of a light-transmissive material has one end as a light entrance and the opposite end as a light exit to which the light detector such as a photomultiplier is connected. By arranging the light guide so that its light entrance extends along the light beam scanning line on the recording medium or stimulable phosphor sheet, light emitted from each scanned point on the recording medium enters the light guide through the light entrance, and is efficiently collected and guided to the light detector.

Where the emitted light is detected through the light guide, however, the output signal from the light detector may be varied by shading of the light guide (which is caused by an area of low light transmitting efficiency at an end of the light guide).

Japanese Laid-Open Patent Publication No. 62-16666, for example, discloses a light detector comprising an elongate photomultiplier having a sufficient long light detecting surface extending along the main scanning line on a recording medium. The disclosed elongate photomultiplier however has light sensitivity irregularities in the longitudinal direction thereof.

Moreover, the intensity of light read by the light detector may be varied in the longitudinal direction by fluctuations in the speed of angular movement of a light deflector such as a galvanometer mirror for deflecting a light beam, or irregularities in the light reflectivity or transmittance of an optical system which guides the light beam to the recording medium.

If any one of the above drawbacks occurs, the output of the light detector may be varied each time the light beams reaches a scanned position in the main scanning direction (such a phenomenon will hereinafter be referred to as "shading"). When shading takes place, it is impossible to detect light from the recording medium correctly.

For overcoming the problem of shading, it has been proposed to determine shading characteristics of the reading apparatus in the main scanning direction prior to the process of reading light emitted from the recording medium, and correct an output signal from the light detector dependent on the shading characteristics in order to cancel out shading-dependent variations in the output readout signal of the light detector.

The variations in the output readout signal from the light detector may be caused by not only the shortcomings, referred to above, in the reading apparatus, but also irregularities in the sensitivity of a stimulable phosphor sheet when radiation image information is read from the stimulable phosphor sheet or irregularities in the energy level of applied radiation when a radiation image is recorded (photographed) on a stimulable phosphor sheet. Such irregularities caused by other than the reading apparatus are frequently varied by a different stimulable phosphor sheet used or replacement of a radiation source. Therefore, if the shading characteristics are to be determined in such a manner to cover the sensitivity and radiation level irregularities as well as the various irregularities or fluctuations in the reading apparatus, there might be an instance wherein actual radiation level irregularities when recording radiation image information are directly opposite to predetermined radiation level irregularities employed when the shading characteristics have been determined. This condition would make the signal correcting process ineffective or rather make the output readout signal largely inaccurate in the signal correcting process.

In view of the aforesaid defects, it is often better to correct the output signal from the light detector based on only the shading characteristics of the image information reading apparatus.

SUMMARY OF THE INVENTION

It is an object of the present invention to provide a method of accurately measuring shading characteristics attributable to only an image information reading apparatus.

According to the present invention, there is provided a method of measuring shading characteristics of an image information reading apparatus for two-dimensionally scanning a recording medium with image information recorded thereon, with a light beam to produce light bearing said image information, and photoelectrically detecting said light with a light detector to produce an image signal representing said image information, said method comprising the steps of:

(i) recording uniform test image information on a test recording medium and scanning the test recording medium with a light beam to produce an image signal in each of two modes in which the test recording medium is oriented such that a prescribed line on the test recording medium extends in a main scanning direction and an auxiliary scanning direction substantially normal to said main scanning direction respectively in said two modes;

(ii) determining a signal level distribution $A(x)$ along said prescribed line of a signal indicative of a logarithmic function of an output signal from said light detector when said prescribed line extends along said main scanning direction, and a signal level distribution B(x) along said prescribed line of a signal indicative of a logarithmic function of an output signal from said light detector when said prescribed line extends along said auxiliary scanning direction (x indicates a pixel position on said prescribed line); and (iii) determining shading characteristics of the image information reading apparatus along said main scanning direction based on the difference A(x)−B(x) between said signal level distributions A(x) and B(x).

Assuming that the shading characteristics in the main scanning direction of the reading apparatus itself are indicated by f(x), variations in the output signal from the light detector due to irregularities in the sensitivity of the recording medium or a stimulable phosphor sheet itself, irregularities in the radiation level caused when recording (photographing) a radiation image, or other irregularities than those caused by the reading apparatus itself are indicated by g(x), and the signal produced by the uniform test image information is indicated by k, then the signal level distribution A(x) produced when the prescribed line extends along the main scanning line is expressed by:

$$A(x) = \log \{k \cdot f(x) \cdot g(x)\}.$$

The signal level distribution B(x) produced when the prescribed line extends along the auxiliary scanning line is expressed by:

$$B(x) = \log \{k \cdot g(x)\},$$

since the prescribed line remains in the same position in the main scanning direction. Therefore, the signal level distribution B(x) along the prescribed line is not affected by the shading characteristics along the main scanning direction of the reading apparatus. Therefore, $$A(x) - B(x) = \log \{k \cdot f(x) \cdot g(x)\} - \log \{k \cdot g(x)\} = \log f(x).$$

Consequently, the shading characteristics f(x) can be determined from the signal level distributions A(x) and B(x).

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

Figure 1:
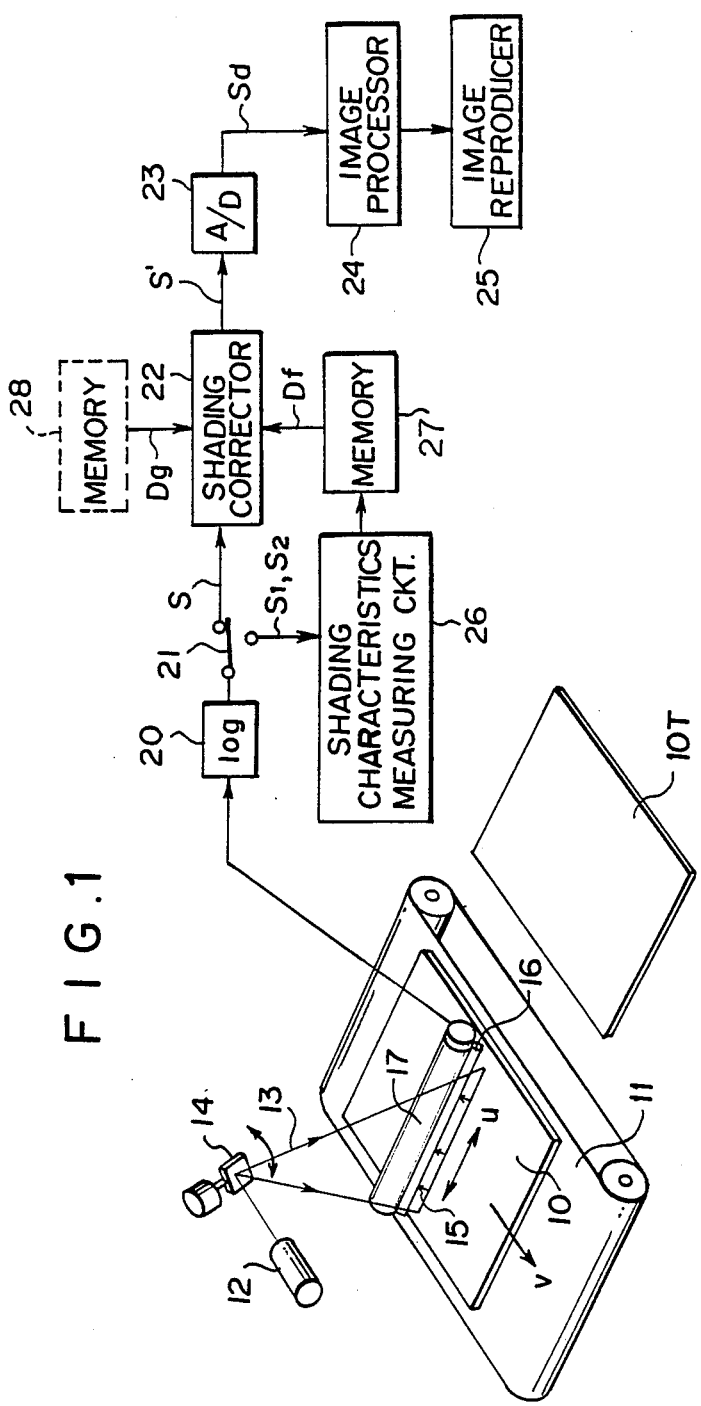
FIG. 1 is a schematic view, partly in block form, of a radiation image information reading apparatus with its shading characteristics measured according to a method of the present invention.

FIG. 1 illustrates a radiation image information reading apparatus, the shading characteristics of which are measured according to a method of the present invention. The radiation image information reading apparatus is employed in a radiation image information recording and reproducing system proposed in Japanese Laid-Open Patent Publications Nos. 55-12429 and 56-11395, for example, by the applicant. The radiation image information reading apparatus reads light emitted from a stimulable phosphor sheet, the light being representative of radiation image information recorded on the stimulable phosphor sheet.

A stimulable phosphor sheet 10 on which radiation image information is recorded in fed in an auxiliary scanning direction of the arrow v by a sheet feeder 11 such as an endless belt. A laser beam 13 emitted as stimulating light from a laser beam source 12 is deflected by a light deflector 14 such as a galvanometer mirror to scan the stimulable phosphor sheet 10 in a main scanning direction of the arrow u which is substantially normal to the auxiliary scanning direction v. The stimulable phosphor sheet 10 emits, from an area thereof irradiated by the laser beam 13, an amount of light 15 which corresponds to the recorded radiation image information. The emitted light 15 is then guided by a light guide 16 and photoelectrically detected by a photomultiplier 17 coupled to the light guide 16. The photomultiplier 17 comprises an elongate photomultiplier having a sufficiently long light detecting surface extending along a main scanning line along which the stimulable phosphor sheet 10 is scanned by the laser beam 13.

An output signal from the photomultiplier 17 is converted into its logarithmic function and amplified by a logarithmic amplifier 20. A signal S from the logarithmic amplifier 20 is fed via a switch 21 and a shading corrector 22 (described later in detail) to an A/D converter 23 by which a corrected signal S' is converted into a digital image signal Sd. The digital image signal Sd is processed for gradation processing, frequency processing, and the like by an image processor 24, after which the processed image signal is applied to an image reproducer 25 such as a CRT, a light scanning device, or the like. Since the digital image signal Sd bears the quantity of emitted light 15, it can be employed to reproduce the radiation image recorded on the stimulable phosphor sheet 10 as a visible image in the image reproducer 25. The digital image signal Sd may be temporarily stored in a recording medium such as a magnetic disc, a magnetic tape, or the like, rather than being directly applied to the image reproducer 25.

The elongate photomultiplier 17 often has sensitivity irregularities in its longitudinal direction, and the light deflector 14 frequently suffers fluctuations in its speed of angular movement. The output signal from the photomultiplier 17 with such sensitivity irregularities varies dependent on the beam-scanned position along the main scanning direction even if the same amount of light 15 is applied from the stimulable phosphor sheet 11 to the photomultiplier 17. The output signal from the photomultiplier 17 may also be varied by irregular light-transmissive efficiencies of the light guide 16 due to its complex shape or irregularities in the reflectivity of a laser beam reflecting mirror which may be disposed between the light deflector 14 and the stimulable phosphor sheet 10.

Figure 2A:
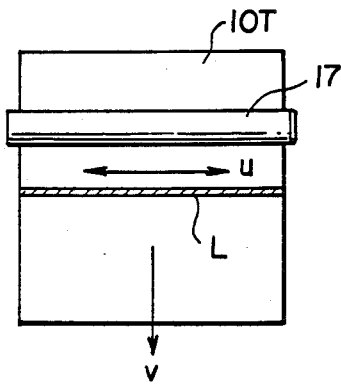
FIGS. 2(a) and 2(b) are views explaining the directions in which image information is read from a test recording medium according to the method of the present invention.
Figure 3A:
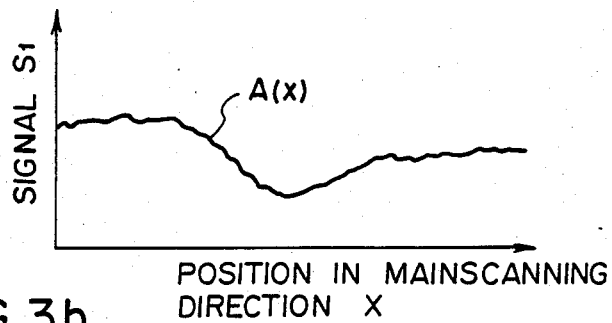
FIGS. 3(a) and 3(b) are graphs showing distributions of readout signals obtained by reading the image information from the test recording medium.

Measurements of such variations in the output signal from the photomultiplier 17 (i.e., shading characteristics of the radiation image information reading apparatus), and correction of the signal S based on the measured shading characteristics will be described below. Prior to reading the radiation image information, a single test stimulable phosphor sheet 10T is uniformly irradiated with a predetermined amount of radiation. Then, the irradiated test stimulable phosphor sheet 10T is placed in the radiation image information reading apparatus shown in FIG. 1 and processed in the same radiation image information reading process as described above. First, as shown in FIG. 2(a), the test stimulable phosphor sheet 10T is read while a prescribed line L thereon is oriented along the main scanning direction u. The output signal from the photomultiplier 17 is applied to the logarithmic amplifier 20 to produce a logarithmic signal $S_1$, which is then applied to a shading characteristics measuring circuit 26 by shifting over the switch 21. The shading characteristics measuring circuit 26 extracts from the signal $S_1$ a signal representative of the stored radiation along the line L, and determines a signal level distribution A(x) along the line L (x indicates a pixel position on the line L). The signal level distribution A(x) may be determined by extracting signals $S_1$ relative to a plurality of lines parallel to the line L, and finding the mean value of the extracted signals. The signal level distribution A(x) thus determined, as indicated in FIG. 3(a), is then stored in a memory in the shading characteristics measuring circuit 26.

Figure 2B:
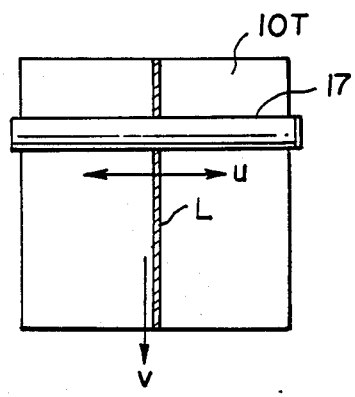
Figure 3B:
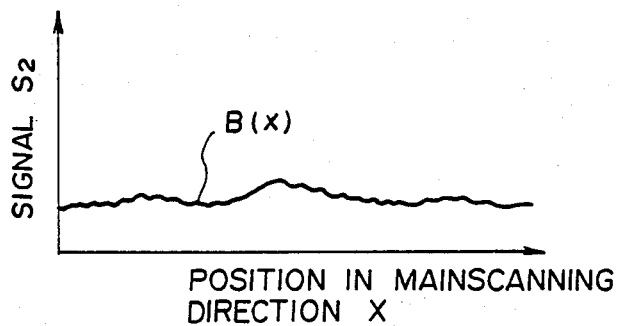

Thereafter, the test stimulable phosphor sheet 10T is irradiated with light in such a wavelength range as to stimulate the phosphor of the stimulable phosphor sheet 10T for thereby causing the stimulable phosphor sheet 10T to emit any remaining radiation energy therefrom. Then, the test stimulable phosphor sheet 10T is uniformly irradiated again with the above predetermined amount of radiation, and then processed in the same radiation image information process as described above. At this time, the stimulable phosphor sheet 10T is turned 90° so that the line L thereon extends in the auxiliary scanning direction v as shown in FIG. 2(b). An output signal $S_2$ produced from the logarithmic amplifier 20 is also sent via the switch 21 to the shading characteristics measuring circuit 26. The shading characteristics measuring circuit 26 extracts from the signals $S_2$ a signal indicating the stored radiation along the line L, and determines a signal level distribution B(x) along the line L. The signal level distribution B(x) is given as shown in FIG. 3(b), for example.

The shading characteristics measuring circuit 26 then reads the signal level distribution A(x) stored in the internal memory, and determines the difference C(x) between the signal level distribution A(x) and B(x) as follows:

$$C(x) = A(x) - B(x)$$

Assuming that the shading characteristics in the main scanning direction of the reading apparatus itself are indicated by f(x), variations in the output signal from the photomultiplier 17 due to irregularities in the sensitivity of the stimulable phosphor sheet itself, irregularities in the radiation level caused when recording a radiation image or other irregularities than those caused by the reading apparatus itself are indicated by g(x), and the signal produced by the radiation energy stored in the test stimulable phosphor sheet 10T upon being irradiated by the predetermined amount of radiation is indicated by k, then the signal level distributions A(x) and B(x) are expressed by:

$$A(x) = \log \{k \cdot f(x) \cdot g(x)\}$$

$$B(x) = \log \{k \cdot g(x)\},$$

as described above. More specifically, when reading the stored radiation from the test stimulable phosphor sheet 10T which is oriented as shown in FIG. 2(a), the shading characteristics in the main scanning direction of the reading apparatus itself, and other irregularities such as sensitivity irregularities of the test stimulable phosphor sheet 10T and variations in the output signal from the photomultiplier 17 due to irregularities in the energy level of the radiation applied to the sheet 10T are added into the signal $S_1$. When reading the stored radiation from the test stimulable phosphor sheet 10T that is oriented as shown in FIG. 2(b), since the line L remains in the same position in the main scanning direction, the signal $S_2$ does not contain the shading characteristics in the main scanning direction of the reading apparatus itself. Therefore, $$C(x) = A(x) - B(x) = \log f(x)$$

The characteristic log f(x) is then stored in a memory 27.

While the stored radiation image information is read from the stimulable phosphor sheet 10, the shading corrector 22 is supplied with the output signal S from the logarithmic amplifier 20 and also information Df indicative of the characteristic log f(x) from the memory 27, and effects the following subtraction:

$$S(x) - \log f(x).$$

This subtraction is carried out with respect to the signal from each scanned position x. If real radiation image information is expressed as R(x), then $$S(x) = \log \{R(x) \cdot f(x) \cdot g(x)\}$$

and hence $$S(x) - \log f(x) = \log R(x) + \log g(x).$$

In the case where the variations g(x) in the output signal from the photomultiplier 17, caused by factors other than the reading apparatus itself, are negligibly small, a signal S' substantially bearing the real radiation image information can be obtained by effecting the above subtraction. By reproducing the radiation image based on the signal S', therefore, a high-quality radiation image free from the shading of the reading apparatus can be obtained.

As indicated by the broken lines in FIG. 1, a memory 28 may be added, and variations g(x) in the output signal from the photomultiplier 17 due to factors other than the reading apparatus itself may separately be measured and its characteristic log g(x) may be stored in the memory 28. Then, when reading radiation image information, the information Df indicative of the characteristic log f(x) may be read from the memory 27 and information Dg indicative of the characteristic log g(x) may be read from the memory 28, and then the following subtraction:

$$S(x) - \{\log f(x) + \log g(x)\}$$

may be effected in the shading corrector 22. Since the result of the subtraction, or the difference, is log R(x), a readout image signal S' can be obtained which is free from both the output variations f(x) due to the reading apparatus itself and the output variations g(x) due to factors other than the reading apparatus itself.

The principles of the present invention have been described as being applied to an apparatus for reading radiation image information from a stimulable phosphor sheet. However, the present invention is not limited to such a radiation image information reading apparatus, but is also applicable to other image information reading apparatus for reading reflected light, transmitted light, or the like bearing image information from a recording medium.

With the present invention, as described above, shading characteristics caused by the image information reading apparatus itself can accurately be measured, and light bearing image information recorded on a recording medium can properly be read by automatically compensating for the measured shading characteristics. Therefore, the image information recorded on the recording medium can be reproduced accurately.

Although a certain preferred embodiment has been shown and described, it should be understood that many changes and modifications may be made therein without departing from the scope of the appended claim.

I claim:

1. A method of measuring shading characteristics of an image information reading apparatus for two-dimensionally scanning a recording medium with image information recorded thereon, with a light beam to produce light bearing said image information, and photoelectrically detecting said light with a light detector to produce an image signal representing said image information, said method comprising the steps of:

(i) recording uniform test image information on a test recording medium and scanning the test recording medium with a light beam to produce an image signal in each of two modes in which the test recording medium is oriented such that a prescribed line on the test recording medium extends in a main scanning direction and an auxiliary scanning direction substantially normal to said main scanning direction respectively in said two modes;

(ii) determining a signal level distribution A(x) along said prescribed line of a signal indicative of a logarithmic function of an output signal from said light detector when said prescribed line extends along said main scanning direction, and a signal level distribution B(x) along said prescribed line of a signal indicative of a logarithmic function of an output signal from said light detector when said prescribed line extends along said auxiliary scanning direction (x indicates a pixel position on said prescribed line); and (iii) determining shading characteristics of the image information reading apparatus along said main scanning direction based on the difference A(x)−B(x) between said signal level distributions A(x) and B(x).

* * * * *